A. NEWSOM.
Plow.

No. 199,736. Patented Jan. 29, 1878.

WITNESSES:
C. Neveux
C. Sedgwick

INVENTOR:
A. Newsom
BY Munn & C,
ATTORNEYS.

N. PETERS, PHOTO-LITHOGRAPHER, WASHINGTON, D. C.

UNITED STATES PATENT OFFICE.

ASA NEWSOM, OF VALDOSTA, GEORGIA.

IMPROVEMENT IN PLOWS.

Specification forming part of Letters Patent No. 199,736, dated January 29, 1878; application filed December 8, 1877.

*To all whom it may concern:*

Figure 1:
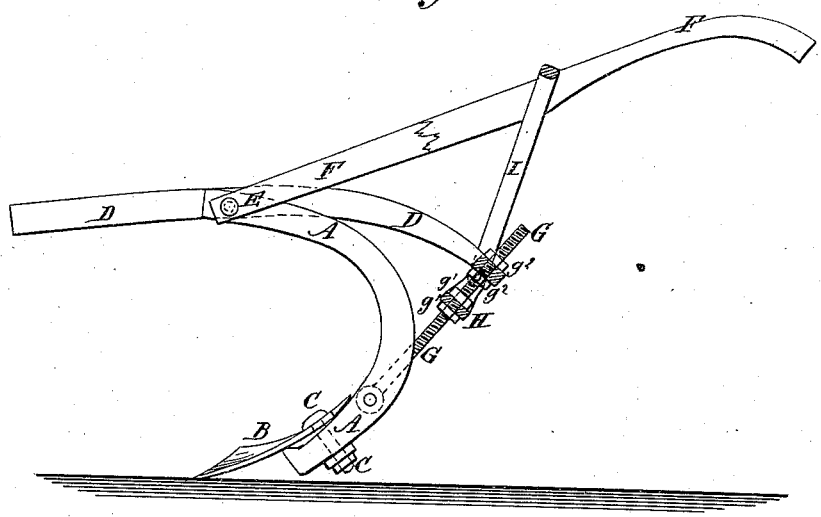
Figure 2:
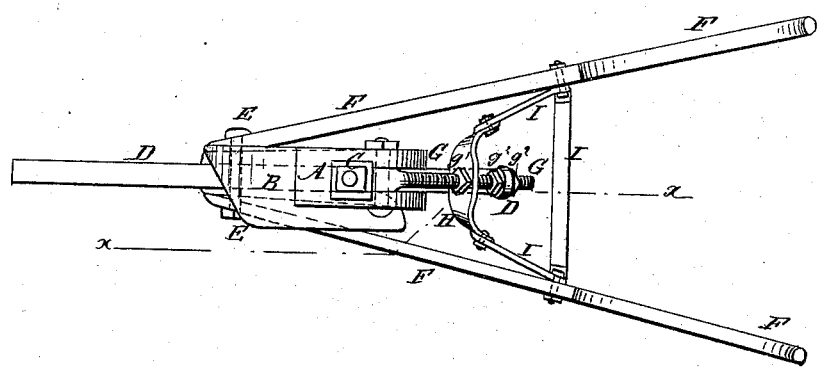

Be it known that I, ASA NEWSOM, of Valdosta, in the county of Lowndes and State of Georgia, have invented a new and useful Improvement in Plow-Stocks, of which the following is a specification:

Figure 1 is a side view of my improved plow-stock, partly in section, through the line x x, Fig. 2, to show the construction; and Fig. 2 is a bottom view of the same.

Similar letters of reference indicate corresponding parts.

The object of this invention is to furnish an improved iron plow-stock which shall be simple in construction, inexpensive in manufacture, light, strong, and durable, and which may be easily adjusted to cause the plow to run deeper or shallower in the ground, as may be desired.

The invention consists in an improved plow-stock formed by the combination of the screw and its two pairs of nuts and the bent bars with the curved slotted standard, the beam, and the handles, as hereinafter fully described.

A represents the plow-standard, which is curved or bent, as shown in Fig. 1, and which is slotted longitudinally from its upper end nearly to its lower end, or which may be formed of a bar of iron bent in the middle, so that its two arms may be parallel with each other, and then bent or curved, as shown.

B represents the plow-plate, which rests upon a rib formed upon the forward side of the lower end of the slotted standard A, and is secured in place by a bolt, C, passing through it and through the slot of the standard A.

D is the plow-beam, the middle part of which is secured to and between the upper ends of the parts of the standard A by a bolt, E. The bolt E also secures the forward ends of the handles F to the plow-beam D and the standard A.

G is a screw, which has an eye formed upon its lower end to receive the bolt or rivet by which it is secured to the lower part of the standard A. The screw G passes through a hole in the bar H, and is secured to said bar by two nuts, $g^1$, which are screwed upon it, one above and the other below the said bar H. The ends of the bar H are bent upward, and are secured by bolts or rivets to the lower ends of the bar I, which is bent twice at an angle, and is secured near its angles by bolts or rivets to the handles F.

The rear end of the beam D has a hole formed through it to receive the screw G, upon which it is secured in place by two nuts, $g^2$, screwed upon the screw G, the one above and the other below the said beam D.

By this construction, by adjusting the nuts $g^2$ the pitch of the plow may be adjusted to cause it to work deeper or shallower in the ground; and by adjusting the nuts $g^1$ the handles F may be adjusted higher or lower, as the height of the plowman may require.

Having thus described my invention, I claim as new and desire to secure by Letters Patent—

An improved shovel-plow formed by the combination of the screw G and its two pairs of nuts $g^1$ $g^2$ and the bent bars H I with the curved slotted standard A, the beam D, and the handles F, substantially as herein shown and described.

ASA NEWSOM.

Witnesses:
W. H. OUSLEY,
J. G. MOORE.